May 30, 1950            J. J. NEFF            2,509,986
ELECTRONIC HEIGHT GAUGE
Filed Aug. 6, 1945
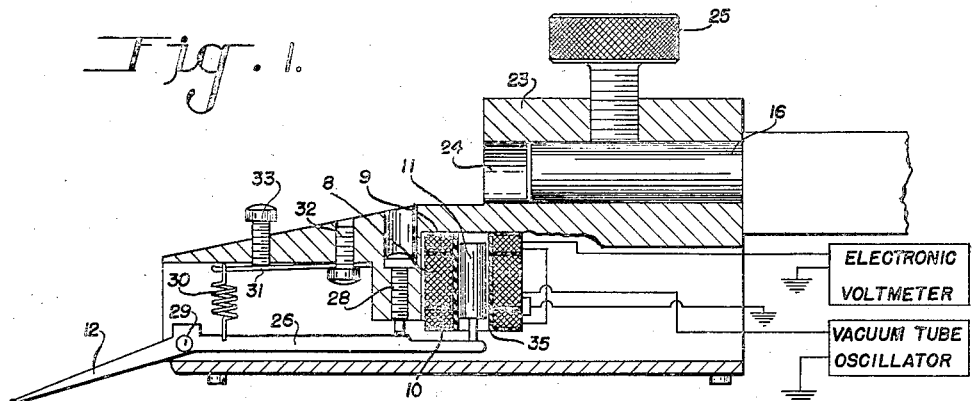
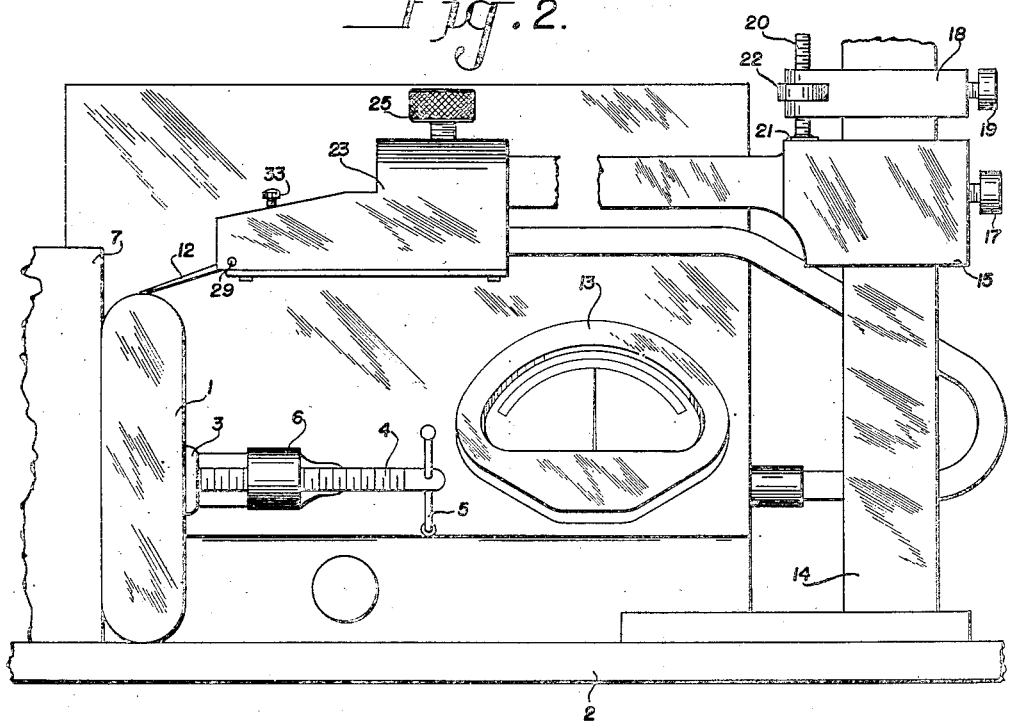
INVENTOR
JOSEPH J. NEFF
BY
Frank H. Harmon
ATTORNEY Patented May 30, 1950

2,509,986

UNITED STATES PATENT OFFICE 2,509,986

ELECTRONIC HEIGHT GAUGE

Joseph J. Neff, South Euclid, Ohio, assignor, by mesne assignments, to Jack & Heintz Precision Industries, Inc., Cleveland, Ohio, a corporation of Delaware Application August 6, 1945, Serial No. 609,209

1 Claim. (Cl. 33—172)

This invention relates to gauges and one of its primary objects is to provide a simple and efficient self-contained electronic gauge for measuring and indicating the height of any article regardless of its size, shape and contour.

With the foregoing and other objects in view the invention resides in the combination of parts and in the details of construction hereinafter set forth in the following specification and appended claim, certain embodiments thereof being illustrated in the accompanying drawings, in which:

Figure 1 is a view in longitudinal section taken through the displacement pickup unit and stylus of the gauge, the electronic circuit being shown diagrammatically; and Figure 2 is a view in side elevation of the displacement pickup unit, its support and the work and its support.

Referring more particularly to the drawings, the article whose height it is desired to measure and indicate is shown at 1. It rests on a flat base 2 and it is adjustably positioned by a member 3 carried by a screw bolt 4 having a hand member 5 and extending through a stationary base member 6 to force the article 1 flush against a vertical base member 7 which is arranged at right angles to the flat base 2.

The electronic gauge employs an electric displacement pickup unit that is similar in nature to that illustrated in the United States patent to Joseph J. Neff, No. 2,361,788, dated October 31, 1944, Displacement pickup, and includes a driving coil 8 with a pickup coil 9 on one side and another pickup coil 10 on the other side of the driving coil through which an armature 11 is mounted for movement in accordance with the pivotal movements of a stylus 12 which rests on the top of article 1 for measurement and indication of its height by an electronic voltmeter instrument 13.

In addition to the precision required in positioning the article 1 whose height it is desired to measure it is of even more importance to properly position with precision the displacement pickup unit and stylus for accurate measurement of the article. Accordingly, there is provided a standard 14 to secure and rigidly support the displacement pickup unit which is clamped at a height above the base established by precision gauge blocks.

Slidably supported on standard 14 is a collar 15 that carries a rod 16. An adjustment retaining thumb bolt 17 passes through collar 15 to impinge on standard 14 to retain collar 15 and rod 16 in any adjusted vertical position on the standard.

In order to provide a vernier adjustment of the height at which the pickup is clamped there is provided an additional collar 18 slidable on standard 14 and maintained in adjusted position by a thumb bolt 19. Collar 18 carries a screw bolt 20 having a flat base 21 and adjustable vertically by a nut 22.

The displacement pickup unit is enclosed in a housing 23 provided with a hole 24 to snugly but slidably receive rod 16 and positioned and retained therein by a thumb bolt 25. The retainer 35 for retaining the driving coil 8 and the two pickup coils is suitably mounted in housing 23. As stated before, an armature 11 is mounted to be movable within coils 8, 9 and 10. The armature is attached to an arm 26 of stylus 12 which is pivoted at 29. Screw bolt 28 is provided for adjusting the position of the armature to obtain an electrical zero position thereof with respect to the driving and pickup coils. This is done before positioning of the work or positioning of the pickup unit at the height desired above the base by the gauge blocks. The arm 26 is normally urged upwardly to force the stylus 12 downwardly by a tension coil spring 30 which is secured to a leaf spring 31 that is secured to the housing by a set screw 32 and adjustable against the action of the spring vertically by a set screw 33. This provides for an adjustable pressure of the stylus on the work.

In addition to the displacement pickup being similar in nature to that shown in United States Patent No. 2,361,788 the same is true with respect to the oscillator and electronic voltmeter circuits, which are also similar to those shown in the United States patent to Joseph J. Neff, No. 2,364,237, December 5, 1944, for Electrical caliper.

Suffice it to say that with the article 1 properly adjusted in the manner described in connection with Figure 2 and with the adjustment of collar 15 to a predetermined height on standard 14, a standard specimen is brought into position to be engaged by the stylus and the gauge head and its pickup unit adjusted to bring the armature into a zero electrical position with respect to the pickup coils so that the indicator reads zero. Thus the voltages that may be induced in pickup coils 9 and 10 by driving coil 8 are equal and in opposition as a result of the coil connections shown in Figure 1 thereby neutralizing the effect of the pickup mechanism on the voltmeter. Dependent upon the pivotal movement of the stylus in its abutment with the upper surface of the article 1 whose height it is desired to measure, the armature 11 will accordingly be moved from its electrical center position, of electronic voltmeter zero reading, to a position where the voltages induced in coils 9 and 10 by driving coil 8 become unequal. This difference in voltage is measured and indicated by the precision electronic voltmeter 13 by means of the circuits shown in Figure 1. The purpose of the adjustable screw 28 is to provide a limit stop for the pivoted stylus arm and allow measurements of articles of height greater or less than a standard specimen.

I claim:

In a device for measuring and indicating the height of a given article, a base and a side wall thereon for supporting said article and adjustable means for moving said article on said base against said wall in a predetermined vertical position, a gauge head, means for mounting said head on said base, a displacement pickup unit mounted in said head comprising a driving coil and a pickup coil on either side thereof and an armature movable longitudinally in said three coils, an arm carrying said armature, said arm being pivoted in said gauge head, an adjustable stop means for adjusting the position of said armature about the pivot of said arm to obtain an electrical zero position with respect to said driving and pickup coils, a spring normally urging said arm in one direction, means for adjusting the vertical tension of said spring, said pivoted arm having a stylus for engaging the article to be measured and means for indicating the displacement of said armature from its electrical center with respect to said pickup coils in response to pivotal movements of said stylus away from an established zero position.

JOSEPH J. NEFF.

REFERENCES CITED

The following references are of record in the file of this patent:

UNITED STATES PATENTS

| Number | Name | Date |
|---|---|---|
| 1,139,936 | Warner | May 18, 1915 |
| 1,928,457 | Mershon et al. | Sept. 26, 1933 |
| 2,326,427 | Bickel | Aug. 10, 1943 |
| 2,361,788 | Neff | Oct. 31, 1944 |